Patented June 16, 1942

2,286,690

UNITED STATES PATENT OFFICE 2,286,690

PROCESS OF PREPARING THIURAM SULPHIDES

Robert L. Sibley, Nitro, W. Va., assignor to Monsanto Chemical Company, St. Louis, Mo., a corporation of Delaware No Drawing. Application September 16, 1940, Serial No. 356,977

11 Claims. (Cl. 260—567)

The present invention relates to the preparation of thiuram disulphides and more particularly to the utilization of hypochlorites for the oxidation of dithiocarbamic acids to the corresponding thiuram sulphides.

While hypochlorites are cheap oxidizing agents their use for the oxidation of dithiocarbamic acids has left much to be desired particularly in the way of yields. However it has been discovered in accordance with the present invention that excellent yields may be obtained with hypochlorites providing there is employed an alkaline solution of the dithiocarbamic acid at a fairly definite pH. That is to say the hydrogen ion concentration must be controlled throughout the oxidation within limits hereinafter defined.

Since a potentiometric method for measuring pH is convenient where frequent or continuous readings are taken as is desirable in the present process, reference will be had to the difference in potential in millivolts between an antimony electrode (indicator electrode) and a saturated calomel half cell as the standard reference electrode, measurement being made by a suitable potentiometer. Expressed as millivolts the oxidation of the dithiocarbamates is carried out at a pH corresponding to about 420–700 millivolts as determined by the system Sb–sat. calomel. However it is generally preferred to maintain the potential at around 490 to 620 millivolts to assure an adequate margin of safety. The exact pH corresponding to these potentials is somewhat uncertain because the so called "salt error" is appreciable in strongly alkaline solutions. For example the range of pH units corresponding to 420–700 millivolts given by any reliable pH instrument is about 7.5 to 12.3. However, for a solution which is 1.0 N with respect to sodium ion a correction of as much as half of a pH unit must be added to these figures. It will of course be appreciated that other methods of measuring pH may be utilized where convenient or desirable or other suitable reference and standard electrodes employed in a potentiometric measurement. While it is to be expressly understood that this invention is not limited to any particular method for measuring pH, an antimony electrode in conjunction with a standard half cell is particularly convenient and perfectly reproducible. For the sake of greater precision in describing the conditions for carrying out the reaction differences in electrode potential rather than pH will be referred to in the description following. Unless otherwise indicated the potentials hereinafter mentioned are the differences in potential of an antimony electrode in conjunction with a standard saturated calomel half cell.

The preferred procedure comprises adding a hypochlorite to a dithiocarbamic acid in aqueous alkaline medium while maintaining the reaction mixture at a pH corresponding to about 490–620 millivolts (Sb-sat. calomel). The rate of addition is governed by the pH and the temperature. That is to say hypochlorite may be added as rapidly as is compatible with the degree of control desired but somewhat better results are obtained by a slow and careful oxidation at reduced temperatures. Since the reaction mixture tends to increase in alkalinity the pH may be kept within the desired range by the addition, independent of the oxidizing agent, of suitable portions of an acid, preferably a mineral acid.

Efficient cooling and agitation are highly beneficial and for best results it is essential that the entire oxidation be carried out in the cold. Temperatures of −5° up to about +6° C. have proved satisfactory but any appreciable increase above 6° C. is certain to result in diminished yields. For example carrying out the reactions at about 10° C. was found to diminish the yield about 10%.

Hypochlorite solutions of around 7%–10% active hypochlorite are satisfactory although other concentrations may be used where desired. Suitable hypochlorites comprise the alkali metal hypochlorites. While hypobromides and hypoiodides behave in similar manner they are of little practical interest due to their comparatively high cost.

Surprisingly a much larger amount of hypochlorite than that theoretically required is necessary for the oxidation of all of the available dithiocarbamic acid. Since the general reaction is believed to be $2RSM + M'ClO + H_2O \rightarrow$
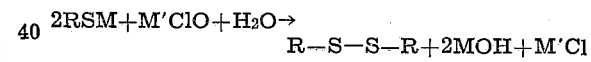
$R-S-S-R + 2MOH + M'Cl$ where R represents a thiocarbamyl radical and M and M' represent alkali metal, it is evident that one molecular proportion of hypochlorite should be sufficient to oxidize two molecular proportions of dithiocarbamate. As a matter of fact a molecular proportion of hypochlorite equal to or even greater than that of the dithiocarbamate is required for maximum yields. With lesser amounts appreciable unreacted dithiocarbamate is left in the filtrate after separation of the insoluble reaction product. In general it is preferred to use an amount of hypochlorite about 150% in excess of that theoretically required.

Methods for preparing dithiocarbamic acids are well known and this invention is not concerned therewith. Where a dithiocarbamate solution contains appreciable free alkali as is sometimes the case since the usual preparation consists in reacting carbon bisulphide with an amine in an excess of a strong base, it is necessary to adjust the potential to 420 to 700 millivolts before the oxidation reaction. Often no adjustment is necessary.

The following are specific embodiments of the invention and are to be understood as illustrative but in nowise limitative of the scope thereof.

*Example I*

Substantially 341 parts by weight of an aqueous solution containing about 52.7 parts by weight of sodium methyl cyclohexyl dithiocarbamate (0.25 molecular proportion) was cooled to 5° C. or below. The potential was adjusted to about 550 millivolts by the addition of 40% sulphuric acid after which 233 parts by weight of substantially 10% sodium hypochlorite (substantially 0.32 molecular proportions) was added thereto. During the addition of the latter the potential was maintained at 510–540 millivolts by the addition of 40% sulphuric acid as required and the temperature was at no time allowed to rise above 6° C. After completion of the reaction the putty like mass of dimethyl dicyclohexyl thiuram disulphide was filtered off and dried. The yield was about 96% of the theoretical.

*Example II*

Substantially 266 parts by weight of an aqueous solution containing about 45.7 parts by weight (0.25 molecular proportion) of sodium cyclo pentamethylene dithiocarbamate was cooled to 5° C. or below. The potential was adjusted to about 550 millivolts, after which 328 parts by weight of 7.1% sodium hypochlorite (substantially 0.32 molecular proportions) was added thereto. During the addition of the latter the potential was maintained at 520–540 millivolts by the addition of 40% sulphuric acid as required and at no time was the temperature allowed to rise above 6° C. After completion of the reaction the separated product was filtered, washed with water and dried to obtain an 85.5% yield of di cyclopentamethylene thiuram disulphide.

*Example III*

Substantially 387 parts by weight of an aqueous solution containing about 63.7 parts by weight of sodium diamyl dithiocarbamate (substantially 0.25 molecular proportion) was cooled to 5° C. or below. The potential was adjusted to about 550 millivolts after which 246 parts by weight of 7.1% sodium hypochlorite (substantially 0.24 molecular proportions) was added thereto. During the addition of the latter the potential was maintained at 490–540 millivolts by the addition of 40% sulphuric acid as required and at no time was the temperature allowed to rise above 6° C. After completion of the reaction the tetra amyl thiuram disulphide which had separated as an amber colored oil was taken up in a suitable solvent as for example ether, and the solvent extracts washed until neutral. The solvent was then removed leaving as a residue about an 89% yield of the aforementioned thiuram compound.

*Example IV*

26.7 parts by weight (substantially 0.1 molecular proportion) of sodium diphenyl dithiocarbamate was stirred into 300 parts by weight of water and the mix cooled to 0° C. To the cold mix so prepared substantially 98 parts by weight of 7.1% sodium hypochlorite (0.094 molecular proportion) were slowly added during which time the potential of the reaction mixture was maintained at 510–540 millivolts (potential of original mix 505 millivolts) and the temperature at 0°–6° C. The product was then filtered off, washed and dried. A 92% yield of tetra phenyl thiuram disulphide was obtained.

*Example V*

Substantially 273 parts by weight of an aqueous solution containing about 29.5 parts by weight of sodium dibenzyl dithiocarbamate (0.10 molecular proportion) was cooled to 5° C. or below. The potential was adjusted to about 550 millivolts after which 96 parts by weight of 7.1% sodium hypochlorite (substantially 0.092 molecular proportion) was added thereto. During the addition of the latter the potential was maintained at 510–540 millivolts by the addition of 40% sulphuric acid as required and the temperature was at no time allowed to rise above 6° C. After completion of the reaction the putty like mass of tetra benzyl thiuram disulphide was separated from the aqueous liquor and dried. The yield was practically quantitative.

*Example VI*

Substantially 217.5 parts by weight of an aqueous solution containing about 28.6 parts by weight of sodium dimethyl dithiocarbamate (substantially 0.2 molecular proportion) was cooled to about −5° C. To the cold aqueous solution of the dithiocarbamate (potential about 580 millivolts) there was added substantially 190 parts by weight of a 9.8% sodium hypochlorite solution (substantially 0.25 molecular proportions). During the addition of the latter the potential was maintained at 580–620 millivolts by the addition of 40% sulphuric acid as required and the temperature was kept below 2° C. After completion of the reaction the precipitate of tetra methyl thiuram disulphide was filtered off, washed with water and dried. The yield was about 87%.

The range of pH units over which the present invention may be successfully operated is quite wide. Thus as stated above a range of at least 4.8 pH units is permitted. In this connection the preparation of tetra methyl thiuram disulphide described in the above example has been carried out at potentials as low as 420 millivolts and as high as 700 millivolts, the yields being within a few percent of the figure given above. However, while the pH range is surprisingly wide it is nevertheless critical. For example starting with a solution of sodium dimethyl dithiocarbamate at a potential of 580 millivolts as employed in Example VI and following the identical procedure outlined in said example except that there was no control of the pH, it was found that the potential gradually increased up to about 760 millivolts and that the yield was diminished by more than 20%. Likewise carrying out the reaction in slightly acid solution greatly diminished the yield.

Obviously the specific procedures described in the foregoing examples may be widely varied without departing from the spirit or scope of the present invention. Other dithiocarbamic acids may be used where convenient or desirable for this invention is applicable to any dithiocarbamic acid including dithiocarbamic acid itself. Likewise the acids may be used in the form of

What is claimed is:

1. The method of making a thiuram disulphide which comprises oxidizing an N-hydrocarbon substituted dithiocarbamic acid by means of a water-soluble hypochlorite while maintaining the reaction mixture at a pH corresponding to about 420–700 millivolts as measured by the system Sb–sat. calomel.

2. The method of making a thiuram disulphide which comprises oxidizing in cold aqueous medium an N-hydrocarbon substituted dithiocarbamic acid by means of a water soluble hypochlorite while maintaining the reaction mixture at a pH corresponding to about 420–700 millivolts as measured by the system Sb–sat. calomel.

3. The method of making a thiuram disulphide which comprises oxidizing in cold aqueous medium an N-hydrocarbon substituted dithiocarbamic acid by means of an alkali metal hypochlorite while maintaining the reaction mixture at a pH corresponding to about 490–620 millivolts as measured by the system Sb–sat. calomel.

4. The method of making a thiuram disulphide which comprises oxidizing in cold aqueous medium an N-hydrocarbon substituted dithiocarbamic acid by means of an alkali metal hypochlorite while maintaining the reaction mixture at a pH corresponding to about 490–620 millivolts as measured by the system Sb–sat. calomel and maintaining the temperature of the reaction mixture below 6° C.

5. The method of making a thiuram disulphide which comprises oxidizing in cold aqueous solution a dialkyl dithiocarbamic acid wherein the alkyl groups contain less than six carbon atoms by means of an alkali metal hypochlorite while maintaining the reaction mixture at a pH corresponding to about 420–700 millivolts as measured by the system Sb–sat. calomel.

6. The method of making tetramethyl thiuram disulphide which comprises oxidizing dimethyl dithiocarbamic acid in cold alkaline aqueous solution by means of an alkali metal hypochlorite while maintaining the reaction mixture at a pH corresponding to 420–700 millivolts as measured by the system Sb–sat. calomel.

7. The method of making tetramethyl thiuram disulphide which comprises oxidizing dimethyl dithiocarbamic acid in cold alkaline aqueous solution by means of an alkali metal hypochlorite while maintaining the reaction mixture at a pH corresponding to 490–620 millivolts and maintaining the temperature of the reaction below 6° C.

8. The step in the process of oxidizing a dithiocarbamic acid to a thiuram disulphide by means of hypochlorite which comprises adding an alkali metal hypochlorite to an N-hydrocarbon substituted dithiocarbamic acid in cold alkaline aqueous medium and independently therewith adding mineral acid at such rate and amount as to keep the reaction mixture at a pH corresponding to about 420–700 millivolts as measured by the system Sb–sat. calomel.

9. The step in the process of oxidizing a dithiocarbamic acid to a thiuram disulphide by means of hypochlorite which comprises adding an alkali metal hypochlorite to an N-hydrocarbon substituted dithiocarbamic acid in alkaline aqueous medium and independently therewith adding mineral acid at such rate and amount as to keep the reaction mixture at a pH corresponding to about 420–700 millivolts as measured by the system Sb–sat. calomel and while maintaining the temperature of the reaction mixture below 6° C.

10. The step in the process of oxidizing a dithiocarbamic acid to a thiuram sulfide by means of hypochlorite which comprises adding an alkali metal hypochlorite to a cold aqueous solution of a dialkyl dithiocarbamic acid and independently therewith adding mineral acid at such rate and amount as to keep said solution at a pH corresponding to 420–700 millivolts as measured by the system Sb–sat. calomel.

11. The step in the process of oxidizing dimethyl dithiocarbamic acid to tetra methyl thiuram disulphide by means of hypochlorite which comprises slowly adding an alkali metal hypochlorite to a cold aqueous solution of a dimethyl dithiocarbamic acid and independently therewith adding mineral acid at such rate and amount as to keep said solution at a pH corresponding to 420–700 millivolts as measured by the system Sb–sat. calomel.

ROBERT L. SIBLEY.